United States Patent [19]
Shoup et al.

[11] Patent Number: 5,797,223
[45] Date of Patent: Aug. 25, 1998

[54] SCREEN DOOR FRAME MEMBER CONNECTION SYSTEM

[76] Inventors: Curtis C. Shoup; Alfonso Muniz, both of 14400 S. San Pedro St., Gardena, Calif. 90248

[21] Appl. No.: 880,839
[22] Filed: Jun. 23, 1997
[51] Int. Cl.$^6$ .................................................. E06B 1/04
[52] U.S. Cl. .................... 52/204.1; 52/656.9; 160/377; 403/233
[58] Field of Search ........................... 52/204.1, 210, 52/211, 212, 213, 656.9, 656.4, 656.7, 656.1; 160/377, 381, 392; 403/233, 230, 187

[56] References Cited

U.S. PATENT DOCUMENTS

| | | | |
|---|---|---|---|
| 1,693,822 | 12/1928 | Shogren | 160/381 |
| 2,918,153 | 12/1959 | Hammitt et al. | 52/204.1 X |
| 3,321,885 | 5/1967 | Pratt | 160/381 X |
| 3,374,597 | 3/1968 | Whitener | 52/656.7 |
| 4,222,209 | 9/1980 | Petersen | 52/656.9 X |
| 4,296,587 | 10/1981 | Berdan | 52/656.9 X |
| 4,651,482 | 3/1987 | Borys | 52/656.9 X |
| 4,683,634 | 8/1987 | Cole | 52/656.9 X |
| 5,431,211 | 7/1995 | Guillemet | 52/656.9 X |
| 5,671,580 | 9/1997 | Choc | 52/656.9 X |

FOREIGN PATENT DOCUMENTS

| | | | |
|---|---|---|---|
| 541117 | 5/1993 | European Pat. Off. | 52/204.1 |
| 2541708 | 8/1984 | France | 52/204.1 |

*Primary Examiner*—Creighton Smith
*Attorney, Agent, or Firm*—Charles H. Thomas

[57] ABSTRACT

An improved screen door frame construction is provided in which at least one transverse door frame member is coupled to the screen door frame stiles by means of plastic coupling elements. The plastic coupling elements are inserted into the opposite ends of each detachable, transverse door frame member. Each coupling element includes a hook that passes across a free, interior wall of a channel formed at the facing, interior side of one of the door stiles. The tips of the coupling elements include barbs that engage in an interlocking fashion with bearing ledges formed on the inside surfaces of the free interior channel walls. The compression bead that is utilized to attach a screen to a door frame serves the further function of maintaining the hooks of the coupling elements in interlocking engagement with the channels of the door frame stiles. The use of the coupling elements of the invention avoids the necessity for prepunching the stiles with openings and forming dangerous, projecting metal fastening tabs on the ends of the transverse door frame members.

15 Claims, 3 Drawing Sheets

SCREEN DOOR FRAME MEMBER CONNECTION SYSTEM

BACKGROUND OF THE INVENTION

1. Field of the Invention

The present invention relates to the construction of screen door frames that are used in building door openings.

2. Description of the Prior Art

In conventional practice in some methods of fabricating a screen door the transverse sheet metal top and bottom rail members, and the intermediate stiffening sheet metal cross members, are frequently attached to the upright stiles by providing the transverse members with projecting tabs and stamping the sheet metal stile stock with corresponding openings. In the assembled screen door frame the tabs project into the openings and are secured therein, thereby joining the upright and transverse frame members together.

Although this conventional assembly system has existed for many years, it does entail certain problems. Doors of different sizes and models require tabs openings in the stiles at different locations along the lengths of the stiles. Therefore, each model of door created requires a different set of punched openings in the stiles. As a consequence, the stamping machines that punch these openings must be set differently for each different door model in the screen door fabrication process. Also, the projecting tabs of the transverse members that are created do present safety hazards to workers assembling the door frames. Cuts from these projecting tabs represent a major source of injuries to workers assembling sheet metal screen doors.

SUMMARY OF THE INVENTION

The present invention involves a screen door frame construction for connecting the transverse members of a screen door frame, such as the top and bottom rails and intermediate cross members, to the vertical stiles of the sides of the door.

Instead of forming the transverse members with projecting tabs, a plastic fastener or connector is formed for each transverse member. The connector is formed from an extruded piece of plastic stock that has a relative thick body section with a U-shaped hook along one of its edges. The outer leg of the U-shaped hook is formed with a barb running the width of the connector.

The present invention provides a unique system that avoids both the projecting tabs and the corresponding openings that have been utilized for so long in sheet metal screen door construction. According to the present invention the stile members are formed from sheet metal stock and folded into a hollow, elongated structure in a conventional manner. However, in the channel that is formed to receive the compressible bead that is pressed against the screen to hold it in the frame, the stile members are each formed with a short length of material that is folded over and projects down into the channel on the inner face of the inner wall of the channel. This extra thickness of metal creates a narrow, downwardly facing ledge on the wall of the channel at the screen opening.

The plastic fastener stock is cut into appropriate widths so that the body of the fastener fits snugly beneath the stiffening lips of each transverse screen frame member. A U-shaped hook projects outwardly from the connector body. The outer edge of the hook formed in the plastic connector projects down into the channel that receives the screen bead. When the bead is inserted into the channel of the stile, it presses the outer leg of the plastic hook tightly against the inner wall of the bead-receiving channel, thus holding the transverse rail member in the desired longitudinal position along the stile. The pressure of the bead is sufficient to prevent the hook of the plastic connector from sliding longitudinally in the screen bead channel. Furthermore, the barb on the outer leg of the hook of the plastic connector engages the ledge formed by the folded over piece of metal forming the longitudinal, inwardly facing ledge in the screen channel. The barb thereby engages the ledge and further restrains the plastic connector from being pulled out of the channel.

By providing the unique plastic connector system of the invention the problems associated with punching openings in the stiles and in the creation of sharp, exposed fastening tabs on the transverse members are eliminated. The present invention thereby provides a screen door frame construction in which the component parts may be handled with far less likelihood of injury during fabrication of the screen door than has heretofore been possible. The invention therefore results in a marked decrease in cuts to the workers building the door frames, and a very substantial reduction in lost time and expense of medical treatment that otherwise results from such injuries.

A further advantage of the present invention is that the use of the unique connectors allows the transverse members of a screen door frame to be coupled to the stiles anywhere along the lengths of the stiles. The coupling member thereby avoids specialized punching of openings in the stiles that are unique to each model of screen door fabricated. Instead, the door stiles may be constructed in a standardized manner to fit within a door opening having a standard six foot eight inch height without any specialized openings cut along the lengths of the stiles to receive the coupling members of the invention. Quite to the contrary, the coupling members of the invention are attachable to the stiles at any location along their lengths.

A further advantage of the invention is that the connector elements may be produced easily, rapidly, and very economically. The plastic connectors are of a uniform cross section throughout their width. Therefore, they can be produced as a continuous plastic extrusion that is cut into sections at intervals corresponding to the required connector width. The connectors may be fabricated in any width to fit transverse frame members of any width merely by altering the intervals at which the continuous extrusion is cut. This system provides an extremely rapid and economical means of fabricating the plastic connectors, and great versatility in that connectors for transverse frame members of any width may be produced from the same plastic extrusion.

In one broad aspect the present invention may be considered to be a screen door frame comprising: a pair of mutually parallel, longitudinally extending door stiles each having a longitudinal channel defined therein for receiving an edge of a screen and a plurality of transverse members oriented perpendicular to the stiles and joined thereto. At least one on the transverse members is detachable from the stiles and is joined thereto by means of a coupling elements located at its opposite ends. The coupling elements are held on the opposite ends of the detachable, transverse member by the force of friction. The coupling elements each include a hook. The hooks extend from the ends of the detachable, transverse member and into the channels of the stiles. An elongated, compressible bead is inserted into the channels of the stiles so as to press the hooks into intimate contact with the channels and thereby immobilize the detachable, transverse element relative to the stiles.

The stiles and the transverse members are preferably formed of sheet metal, while the coupling elements are preferably formed of plastic. Also, the plastic coupling elements preferably have a uniform cross section throughout their widths.

In a preferred embodiment of the invention the channels of the stiles are formed with free terminal, interior walls rising from the channel floors. The interior walls of the channels are created with bearing ledges facing the channel floors. The hooks of the coupling elements are formed with barbs that are forced into engagement with the bearing ledges when the bead is inserted into the channels. The hooks of the coupling elements are thereby engaged in interlocking fashion with the channel walls.

Each detachable, transverse member is preferably formed of sheet metal configured with a uniform cross section at its ends and shaped with a concave back side that defines a pair of retaining lips along its edges. The bodies of the coupling members fit snugly into the concave back side of the detachable, transverse members. The retaining lips of each transverse member press against the coupling members to hold them tightly with a frictional force.

In another broad aspect the invention may be considered to be a screen door comprising a pair of mutually parallel door stiles having interior sides with longitudinally extending channels defined therein and a plurality of transverse members oriented perpendicular to and connected to the door stiles. These transverse members include at least one detachable, transverse member formed as a structure separate from the stiles and having opposing sides and opposing ends. A coupling member is inserted into each of the opposing ends of the detachable, transverse member. The sides of each detachable, transverse member frictionally grip the coupling member inserted therein.

Each coupling member has a hook and the hooks of the coupling members protrude from the ends of the detachable, transverse members. These hooks extend into the channels of the stiles. An elongated, compressible bead is inserted into the channels of the stiles to hold the hooks in frictional engagement with the channels of the stiles.

In still another broad aspect the invention may be considered to be an improvement in a screen door frame having a pair of mutually parallel stiles and a plurality of transverse members extending between and connected to the stiles. The stiles are each provided with a longitudinal channel having a free interior wall. A screen is stretched between the stiles and extends into the channels thereof. An elongated, compressible bead is disposed in the channels against the screen therein to engage the screen with the channels of the stiles. According to the improvement of the invention at least one of the transverse members is detachable from the stiles and has opposing ends. The detachable, transverse members are formed separate from the stiles. Each detachable, transverse member is configured with a channel-shaped cross section having a pair of inwardly directed lips at its edges. These lips are disposed in mutually facing relationship.

Separate coupling members are located at the opposing ends of each detachable, transverse member. Each coupling member is formed at one of its ends with a body that fits into one of the ends of the detachable, transverse member. The body is frictionally held within the transverse member by the lips at the edges of each transverse member. At its other end each coupling member has a hook that engages the free interior wall of the channel of one of the stiles. The screen bead presses the hook against the interior wall of the channel and holds it in frictional engagement therewith.

The invention may be described with greater clarity and particularity by reference to the accompanying drawings.

DESCRIPTION OF THE EMBODIMENT

Figure 1:
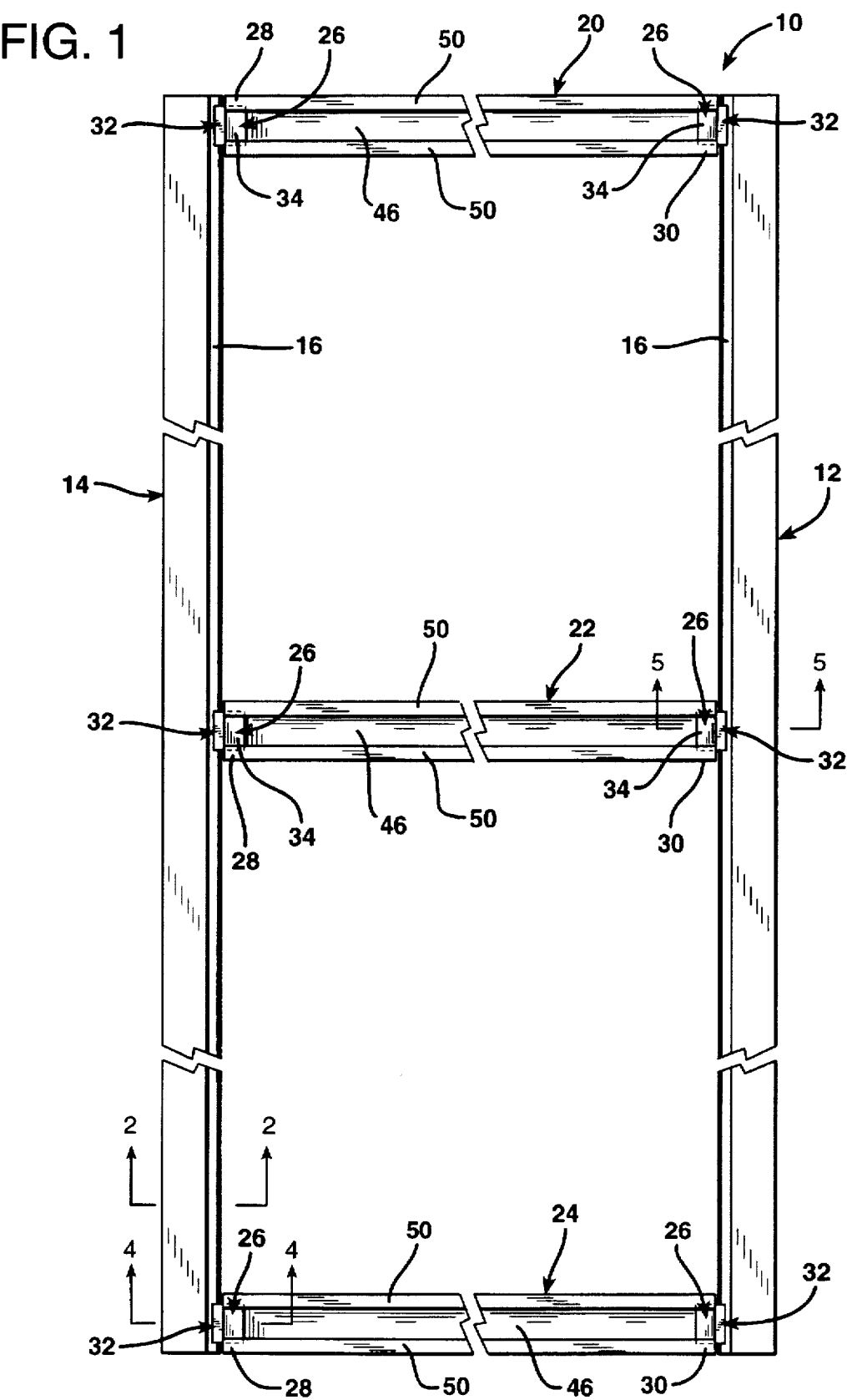
FIG. 1 is an elevational view of the rear of one embodiment of a screen door frame constructed according to the invention.

FIG. 1 illustrates a screen door frame 10 for use as an outer door in a building doorway and depicted prior to installation of a screen therein. The screen door frame 10 is comprised of a pair of mutually parallel door stiles 12 and 14, each having an interior side with a longitudinally extending channel 16 defined therein. The door frame 10 is further comprised of a plurality of transverse members 20, 22, and 24 oriented perpendicular to and connected to the door stiles 12 and 14 by means of coupling members 26.

Figure 6:
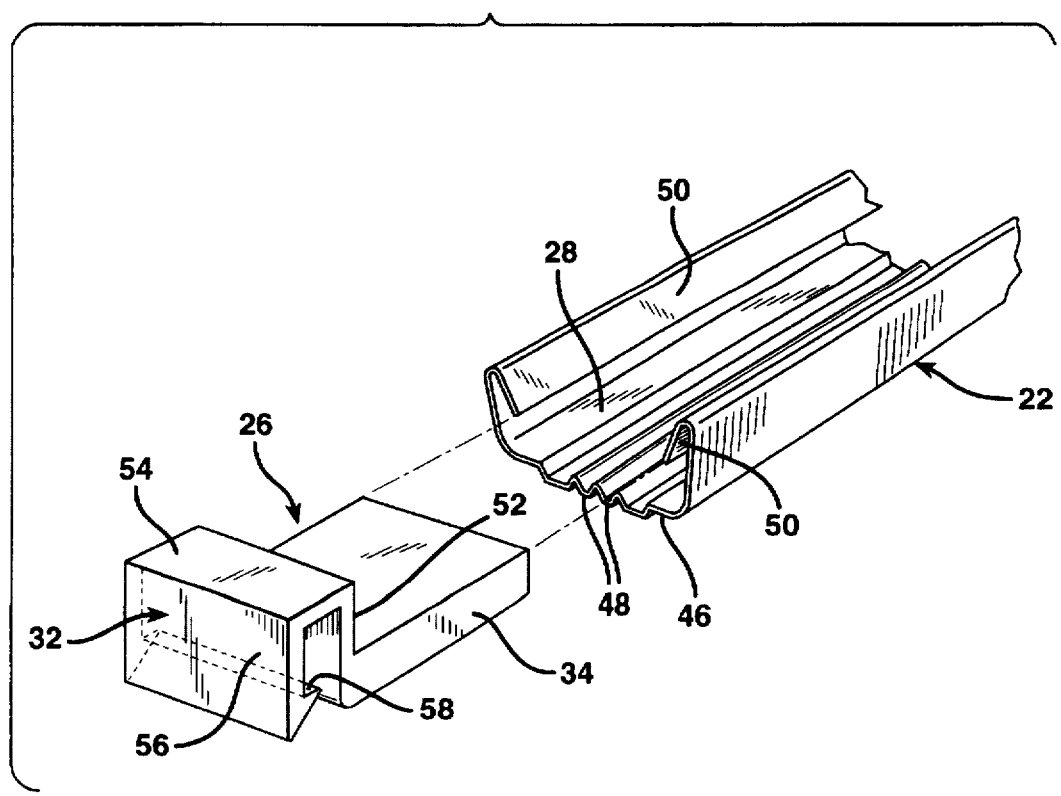
FIG. 6 is an exploded perspective view illustrating the connection of the coupling member to a detachable, transverse cross member of the door frame of FIG. 1.

In the embodiment illustrated, the intermediate transverse door frame member 22 is detachable from the stiles 12 and 14, as are the top transverse door frame member 20 and the bottom transverse door frame member 24. The transverse door frame members 20, 22, and 24 are all formed as separate structures from the stiles 12 and 14. Each of the separate, detachable, transverse door frame members 20, 22, and 24 has a pair of opposing ends 28 and 30. As illustrated in FIG. 6, the coupling members 26 are inserted into each of the opposing ends 28 and 30 of each of the transverse door frame members 20, 22, and 24 so that the sides of the detachable, transverse door frame members 20, 22, and 24 frictionally grip the coupling members 26 that are inserted therein.

Figure 3:
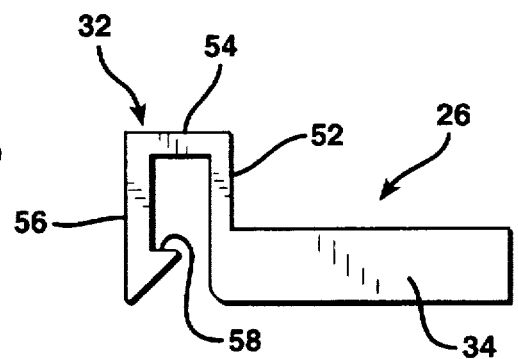
FIG. 3 is an edge detail of a coupling element according to the invention, shown in isolation.
Figure 4:
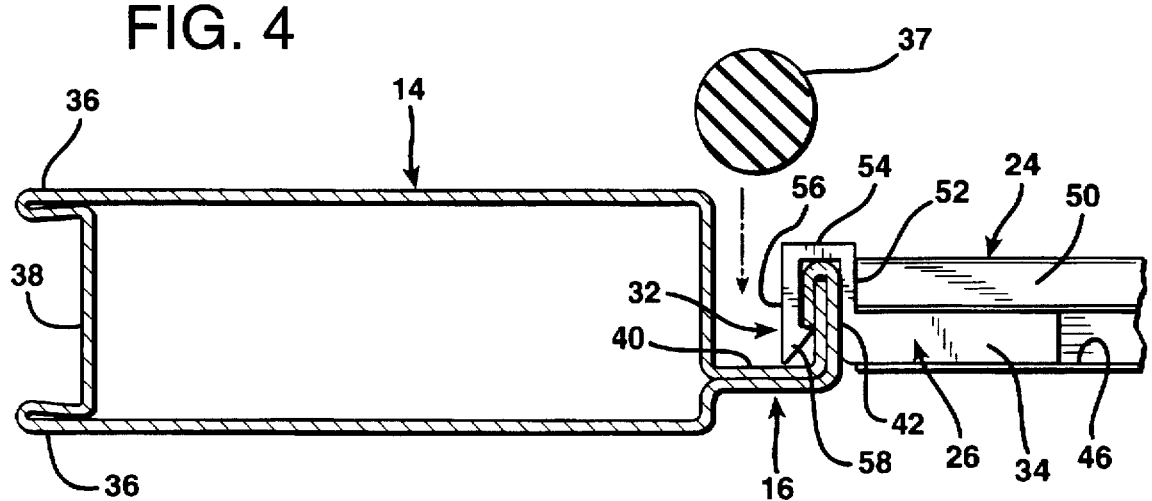
FIG. 4 is a sectional elevational detail taken along the lines 4—4 showing the manner of interconnection of a detachable, transverse member and a stile of the door frame illustrated in FIG. 1.
Figure 5:
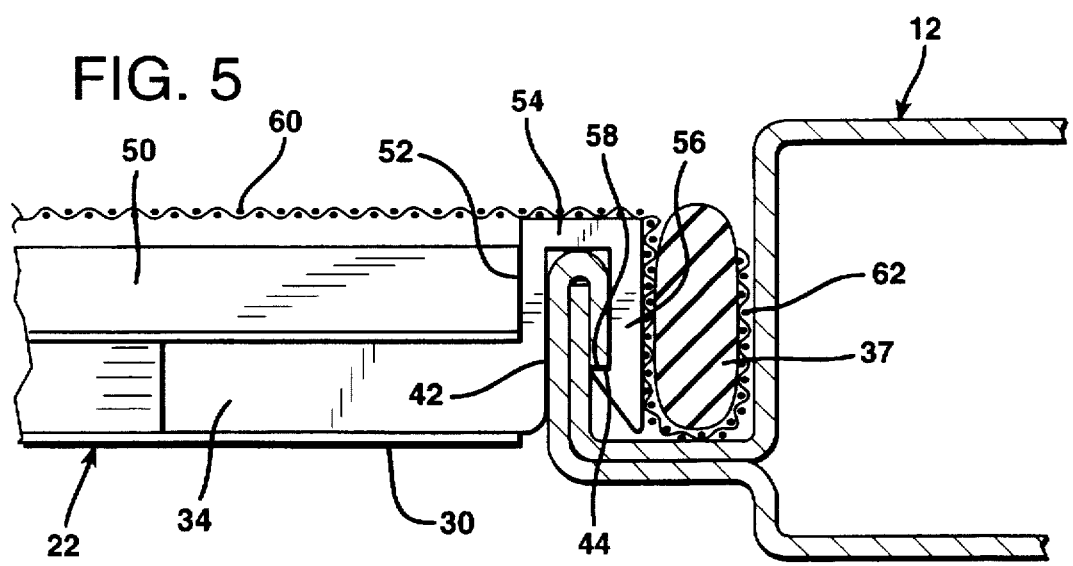
FIG. 5 is a sectional elevational detail taken along the lines 5—5 of FIG. 1 and showing completion of the installation partially depicted in FIG. 4.

As best illustrated in FIGS. 3 and 6, each of the coupling members 26 has a hook 32 at one of its ends and a body 34 at its opposite end. The hooks 32 protrude from the ends of the detachable, transverse members 20, 22, and 24 and extend into the channels 16 of the stiles, as illustrated in FIGS. 4 and 5. Also, an elongated, compressible bead 36 is provided. The bead 36, in its undeformed state, has a circular cross section as illustrated in FIG. 4. The bead 36 is inserted into the channels 16 of the stiles 12 and 14 to hold the hooks 32 of the coupling members 26 in frictional engagement with the channels 16 of the stiles 12 and 14.

Figure 2:
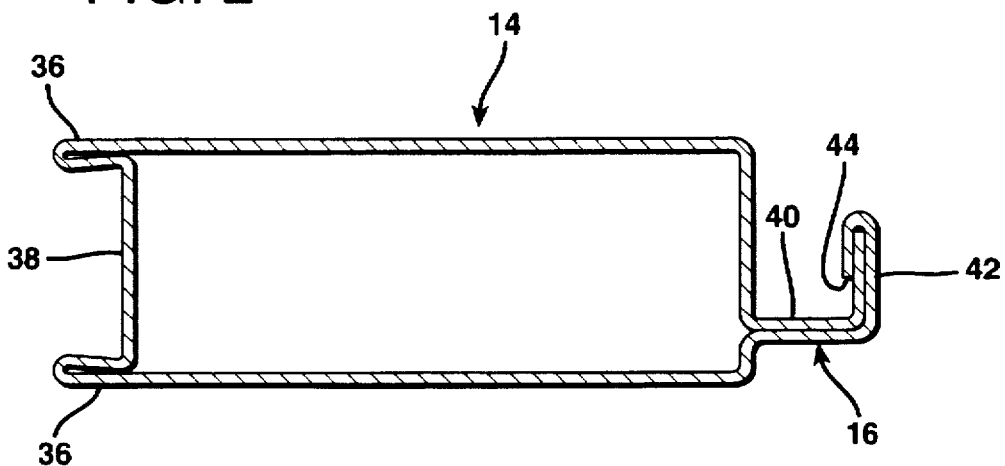
FIG. 2 is a sectional detail taken along the line 2—2 of FIG. 1.

As best illustrated in FIG. 2, the stiles 12 and 14 are each formed from a single elongated strip of thin sheet metal, such as sixteen gauge steel. The metal strip is folded by a series of rolling steps which results in the creation of a structure that has a generally rectangular cross section with a plurality of exterior side extensions 36 separated from each other by a web 38. A channel 16 is formed on each interior side of the stiles 12 and 14.

The stiles 12 and 14 are produced by sequentially advancing the metal strip from which they are fabricated through various rollers to produce successive distortions to change the shape of the metal strip from a flat sheet of metal to the closed, hollow structure depicted in FIG. 2. The steps in this regard are substantially as described in U.S. Pat. No. 5,018, 263, which is incorporated herein by reference.

As illustrated in FIG. 2, a channel 16 is formed along each interior side of the stiles 12 and 14 where the edges of the metal strips forming the stiles 12 and 14 are brought together. These metal edges are brought into contact with each other to form the channel floor 40 and a free, terminal, interior wall 42 along the interior side of each of the stiles 12 and 14. The interior wall 42 rises from the channel floor 40 and is formed of at least a double thickness of metal throughout its entire height. One of the edges of the sheet of metal that is folded to form the stile is wrapped over the other to create a treble thickness of the interior wall 42 that terminates in a bearing ledge 44 that overhangs and faces the floor 40 of the channel 16. The bearing ledge 44 is equal in width to the thickness of the strip of metal used to form the stiles 12 and 14, which is typically between sixteen and twenty gauge steel.

Each of the detachable, transverse door frame members 20, 22, and 24 is likewise formed from a single strip of sheet metal configured with a uniform cross section along its length. As illustrated, for example, in FIG. 6, the detachable transverse member 22 is shaped with a convex back side 46 having a series of stiffening corrugations 48 thereon. The edges of the strip of sheet metal forming the transverse member 22 are bent away from the concave back side 46 and are turned over to define a pair of retaining lips 50 that are directed back toward the concave, channel-shaped surface of the transverse member 22.

Each of the coupling elements 26 is formed of an extruded plastic, such as polyvinyl chloride, polypropylene, or polyethylene. The coupling elements 26 each include a generally rectangular-shaped body portion 34 at one end, and a hook 32 at the other end. The hook 32 is formed with a back 52 oriented substantially perpendicular to the body 34, a longitudinal extension 54 that extends generally parallel to the body 34, and a return wall 56 that extends back toward the body 34, and which includes a barb 58 defining a surface generally parallel to the longitudinal extension 54.

The coupling member 26 has a uniform cross section throughout, when viewed perpendicular to its length as illustrated in FIG. 3. As a consequence, each of the coupling elements 26 may be cut from a single extruded length of plastic to create a coupling element 26 of any desired width. For example, some screen door frames 10 require wider transverse members than others. The plastic extrusion is merely cut at intervals to accommodate the width of the coupling element 26 desired, so that the body 34 thereof will fit snugly into the concave configuration of the transverse cross member 20, 22, or 24 with which it is to be utilized.

As best illustrated in FIGS. 1 and 6, the body 34 of each coupling member 26 fits snugly into either the end 28 or the end 30 of the transverse door frame member 20, 22, or 24 with which it is to be utilized. Each transverse door frame member 20, 22, and 24 is of uniform cross section throughout its length, so that a coupling member 26 that fits into the end 28 of a transverse cross member will also fit snugly into the other end 30 of that same transverse cross member.

As illustrated in FIGS. 3 and 6, the hooks 32 of each coupling member 26 each have a generally U-shaped configuration with a barb 58 near the terminal extremity of the return 56. The rectangular body 34 of the coupling element 26 that is cut to a width suitable for insertion into the detachable, transverse door frame member 22 is forced into the end 28 thereof. The body 34 of an identical coupling member 26 is forced into the opposite end 30 of the transverse door frame member 22. The door frame member 10 is formed with a concave back side 46 and the pair of lips 50 are turned in over the back side 46. The bodies 34 of the coupling members 26 fit snugly into the transverse door frame member ends 28 and 30. The bodies 34 of the coupling members 26 may be inserted into the ends 28 and 30 of the detachable, transverse member 22 so as to be captured by the lips 50 of the transverse door frame member 22.

Due to its U-shaped configuration, the backs 52 of the hooks 32 of the coupling members 26 for the transverse members 20, 22, and 24 reside in abutting relationship against the opposing ends 28 and 30 of the detachable, transverse members 20, 22, or 24 with which they are employed. The coupling members 26 are thereby captured by the lips 50 which hold their bodies 34 immobile and their hook backs 52 against the end edges of the detachable, transverse member 22.

The barb 58 of each hook 32 extends back toward the body 34 thereof and forms a shoulder that is parallel to the laterally-extending portion 54 of the hook 32. As best illustrated in FIG. 4, the portion 54 of each coupling member 26 passes across the top of the free interior wall 42 of the channel 16 into which the hook 32 has been inserted.

A compressible bead 36 of generally circular cross section, when undeformed, is pressed into the channel 16. Before inserting the bead 36 into the channel 16, however, a screen 60, illustrated in FIG. 5, is stretched across the opening of the screen door frame 10 so that the side edges 62 of the screen 60 extend down into the channels 16 of the stiles 12 and 14. The compression bead 36 is inserted into the channel 16 until the screen 60 has been stretched to this extent. In this connection the screen 60 passes over the top of the hook 32, so that the return 56 of the hook 32 resides between the screen 60 and the free interior wall 42.

The compressible bead 36 is thereupon forced down into the channel 16 and against the edge 62 of the screen 60. This aids in further stretching the screen 60 between the opposing stiles 12 and 14, and also forces the hook 32 toward the free interior wall 42 of the channel 16 into which the compressible bead 36 has been inserted.

The barb 58 and the bearing ledge 44 are aligned relative to each other so that the barb 58 passes just beneath the bearing ledge 44. When the bead 36 has been pressed into position, whereupon it is resiliently deformed as illustrated in FIG. 5, the barb 58 is forced into interlocking engagement with the bearing ledge 44. Furthermore, the extent of compression of the bead 36 is sufficient to create a large frictional force between not only the side marginal edge 62 of the screen 60 and the channel 16, but also a considerable frictional force between the hook 32 and the free interior wall 42 of the channel 16.

Once the compressible bead 36 has been installed in the channel 16, as illustrated in FIG. 5, the detachable, transverse frame members 20, 22, and 24 are firmly locked against the stiles 12 and 14, and cannot be moved relative thereto without first removing the compressible bead 36. The hooks 32 and the channels 16 are thereby configured with interlocking elements 58 and 44, respectively. These interlocking elements hold the hooks 32 in interlocking engagement with the channels 16 of the stiles 12 and 14.

The cross section of the coupling members 26 is uniform in a direction perpendicular to the length of the stiles 12 and 14. The marginal side edges 62 of the screen 60 extend down into the channel 16 of the stiles 12 and 14 atop the hooks 32. The compression bead 36 thereby not only holds the screen 60 frictionally engaged with the stiles 12 and 14, but additionally holds the detachable, transverse frame members 20, 22, and 24 immobilized relative to the stiles 12 and 14 until or unless the compression bead 36 is removed from the channel 16.

Undoubtedly, numerous variations and modifications of the invention will become readily apparent to those familiar with screen door construction. For example, it is evident that not all of the transverse screen door frame members need to be detachable. In some door constructions the stiles and the transverse top and bottom members extending therebetween are all formed from a single sheet of metal, and are not detachable from each other. Likewise, other modifications to the invention are possible, such as omission of a barb from the hook. Accordingly, the scope of the invention should not be construed as limited to the specific embodiment depicted and described.

We claim:

1. A screen door frame comprising:
a pair of mutually parallel, longitudinally extending door stiles each having a longitudinal channel defined therein for receiving an edge of a screen;
a plurality of transverse members oriented perpendicular to said stiles and joined thereto, wherein at least one of said transverse members is detachable from said stiles and is joined thereto by means of a pair of coupling elements located at its opposite ends, wherein said coupling elements are held on said opposite ends of said detachable, transverse member by the force of friction, and said coupling members each include a hook, and said hooks extend from said ends of said detachable, transverse member and into said channels of said stiles, and an elongated, compressible bead is inserted into said channels of said stiles so as to press said hooks into intimate contact with said channels and thereby immobilize said detachable, transverse member relative to said stiles.

2. A screen door frame according to claim 1 wherein said stiles and said transverse members are formed of a metal and said coupling elements are formed of plastic.

3. A screen door frame according to claim 2 wherein said plastic coupling elements have a uniform cross section throughout their widths.

4. A screen door frame according to claim 1 wherein said channels of said stiles are formed with free terminal interior walls rising from channel floors, and said interior walls of said channels are created with bearing ledges facing said channel floors, and said hooks of said coupling elements are formed with barbs that are forced into engagement with said bearing ledges when said bead is inserted into said channels.

5. A screen door frame according to claim 4 wherein said detachable, transverse member is formed of sheet metal configured with a uniform cross section at its opposite ends and shaped with a concave back side that defines a pair of retaining lips along its edges at said opposite ends, and said retaining lips press said coupling members against said concave back side of said detachable, transverse member.

6. A screen door comprising:
a pair of mutually parallel door stiles having interior sides with longitudinally extending channels defined therein,
a plurality of transverse members oriented perpendicular to and connected to said door stiles, including at least one detachable, transverse member formed as a structure separate from said stiles and having opposing sides and opposing ends, and a coupling member inserted into each of said opposing ends of said detachable, transverse member, whereby said sides of said detachable, transverse member frictionally grip said coupling members inserted therein, and each coupling member has a hook and said hooks protrude from said ends of said detachable, transverse member and extend into said channels of said stiles, and further comprising an elongated, compressible bead inserted into said channels of said stiles to hold said hooks in frictional engagement with said channels of said stiles.

7. A screen door according to claim 6 wherein said stiles and said transverse members are formed of bent sheet metal and said coupling members are formed as sections of extruded plastic.

8. A screen door according to claim 6 wherein said channels of said stiles are each formed by the edges of a sheet of metal folded together; wherein one of said edges of said sheet of metal is wrapped over the other to create a bearing ledge, and said hooks of said coupling members are provided with barbs, and said bead forces said barbs into interlocking engagement with said bearing ledges when said bead is inserted into said channels.

9. A screen door according to claim 6 wherein said hooks have a U-shaped configuration and reside in abutting relationship against said opposing ends of said detachable, transverse member.

10. A screen door according to claim 6 wherein said detachable, transverse member is formed with a concave backside and a pair of lips turned in over said backside, and said coupling members are inserted into said ends of said detachable, transverse member and are captured by said lips which hold said coupling members immobile against said backside of said detachable, transverse member.

11. A screen door according to claim 6 further comprising a screen that extends down into said channels of said stiles atop said hooks and said bead additionally holds said screen frictionally engaged with said stiles.

12. A screen door according to claim 6 wherein said hooks and said channels are configured with interlocking elements, and said bead holds said hooks in interlocking engagement with said channels.

13. In a screen door having a pair of mutually parallel stiles and a plurality of transverse members extending between and connected to said stiles, wherein said stiles are each provided with a longitudinal channel having a free interior wall, a screen stretched between said stiles and extending into said channels thereof, and an elongated, compressible bead disposed in said channels against said screen therein to engage said screen with said channels of said stiles, the improvement wherein at least one of said transverse members is detachable from said stiles and has opposing ends and is formed separate from said stiles and is configured with a channel-shaped cross section having a pair of inwardly directed lips at its ends disposed in mutually facing relationship, and separate coupling members located at said opposing ends of said detachable, transverse member, wherein each coupling member has at one of its ends a body that fits into one of said ends of said detachable, transverse member and said bodies are frictionally held within said ends of said detachable, transverse member by said lips, and each coupling member has at the other of its ends a hook that engages said free interior wall of said channel of one of said stiles, and said bead presses said hooks against said interior walls of said channels and holds them in frictional engagement therewith.

14. A screen door according to claim 13 wherein said coupling members each have a uniform cross section in a direction parallel to their length and perpendicular to said stiles.

15. A screen door according to claim 13 wherein said hooks of said coupling members are equipped with barbs that project toward said free interior walls of said channels and said free interior walls of said channels are provided with elements that overhang said channels, whereby said bead holds said barbs and said overhanging elements in interlocking engagement with each other.

* * * * *